(12) United States Patent
Oyanagi (10) Patent No.: US 11,853,744 B2
(45) Date of Patent: Dec. 26, 2023

(54) ANALYSIS DEVICE, ANALYSIS METHOD, AND ANALYSIS PROGRAM

(71) Applicant: Nippon Telegraph and Telephone Corporation, Tokyo (JP)

(72) Inventor: Hiroyuki Oyanagi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 127 days.

(21) Appl. No.: 17/428,852

(22) PCT Filed: Jan. 22, 2020

(86) PCT No.: PCT/JP2020/002093
§ 371 (c)(1),
(2) Date: Aug. 5, 2021

(87) PCT Pub. No.: WO2020/162174
PCT Pub. Date: Aug. 13, 2020

(65) Prior Publication Data
US 2022/0121441 A1    Apr. 21, 2022

(30) Foreign Application Priority Data

Feb. 5, 2019 (JP) .................................. 2019-018848

(51) Int. Cl.
*G06F 9/44* (2018.01)
*G06F 8/70* (2018.01)

(52) U.S. Cl.
CPC ...................................... *G06F 8/70* (2013.01)

(58) Field of Classification Search
None
See application file for complete search history.

(56) References Cited

U.S. PATENT DOCUMENTS

| 2011/0093773 A1* | 4/2011 | Yee | G06F 16/986 |
| | | | 715/234 |
| 2013/0097293 A1* | 4/2013 | Gibson | G06F 9/5055 |
| | | | 709/221 |
| 2016/0188695 A1* | 6/2016 | Lee | G06F 8/60 |
| | | | 707/738 |

FOREIGN PATENT DOCUMENTS

JP    2014032466    2/2014

* cited by examiner

*Primary Examiner* — Wei Y Zhen
*Assistant Examiner* — Lanny N Ung
(74) *Attorney, Agent, or Firm* — Fish & Richardson P.C.

(57) ABSTRACT

Provided is a technique for analyzing connection compatibility between software applications such as OSS. An analysis device 1 includes an acquisition unit 12 that acquires a first source code of a connection source OSS (Open Source Software) application, a second source code of a connection destination OSS application, and a connection plug-in for the connection source OSS application and the connection destination OSS application; a first analysis unit 131 that calculates a first compatibility based on the number of duplicate data formats between an output plug-in of the first source code and an input plug-in of the second source code; a second analysis unit 132 that calculates a second compatibility based on the number of functions and the number of instances included in the connection plug-in; and a third analysis unit 133 that calculates a connection compatibility between the connection source OSS application and the connection destination OSS application using the first compatibility and the second compatibility.

5 Claims, 6 Drawing Sheets

ANALYSIS DEVICE, ANALYSIS METHOD, AND ANALYSIS PROGRAM

CROSS-REFERENCE TO RELATED APPLICATIONS

This application is a National Stage application under 35 U.S.C. § 371 of International Application No. PCT/JP2020/002093, having an International Filing Date of Jan. 22, 2020, which claims priority to Japanese Application Serial No. 2019-018848, filed on Feb. 5, 2019. The disclosure of the prior application is considered part of the disclosure of this application, and is incorporated in its entirety into this application.

TECHNICAL FIELD

The present invention relates to an analysis device, an analysis method, and an analysis program for analyzing connection compatibility between software applications such as OSS.

BACKGROUND ART

It is expected that defining the functions of a system such as OpS (Operation Support System) as components to implement each functional component by means of OSS (Open Source Software) shortens the system development period, reduces development costs, improves expandability, etc. OpS is a system required for a business operator (carrier) for providing a communication service to build and operate the service. OSS is free software that allows to freely modify or redistribute the source code.

There is also a technique for calculating the complexity of a program (PTL 1).

CITATION LIST

Patent Literature

[PTL 1] Japanese Patent Application Publication No. 2014-032466

SUMMARY OF THE INVENTION

Technical Problem

In constructing a system by combining a plurality of OSS applications, connections between the OSS applications are indispensable. In connecting between the OSS applications, the OSS applications have been sophisticated, and further the availability of distribution data (syslog, file, stdin/out) differs depending on an OSS application which is a connection destination, which means that the supported functions change. Accordingly, each time a system is developed, a manual investigation is required to determine a combination of a plurality of OSS applications.

In the future, it is expected that the number of candidates for an OSS application will be enormous, and thus the choices of OSS applications will increase. This causes a problem that the operating load of investigation for selecting an optimum OSS application increases and thus the speed of system development is impaired.

The present invention has been made in view of the above circumstances, and an object of the present invention is to provide a technique for analyzing connection compatibility between software applications such as OSS.

Means for Solving the Problem

In order to achieve the above object, one aspect of the present invention is an analysis device that includes an acquisition unit that acquires a first source code of a connection source OSS (Open Source Software) application, a second source code of a connection destination OSS application, and a connection plug-in for the connection source OSS application and the connection destination OSS application; a first analysis unit that calculates a first compatibility based on the number of duplicate data formats between an output plug-in of the first source code and an input plug-in of the second source code; a second analysis unit that calculates a second compatibility based on the number of functions and the number of instances included in the connection plug-in; and a third analysis unit that calculates a connection compatibility between the connection source OSS application and the connection destination OSS application using the first compatibility and the second compatibility.

One aspect of the present invention is an analysis device that includes an acquisition unit that acquires a first source code of a connection source software application, a second source code of a connection destination software application, and connection plug-ins for the connection source software application and the connection destination software application; a first analysis unit that calculates a first compatibility based on the number of duplicate data formats between an output plug-in of the first source code and an input plug-in of the second source code; a second analysis unit that calculates a second compatibility based on the number of functions and the number of instances included in the connection plug-ins; and a third analysis unit that calculates a connection compatibility between the connection source software application and the connection destination software application using the first compatibility and the second compatibility.

One aspect of the present invention is an analysis method implemented by a computer that includes an acquisition step of acquiring a first source code of a connection source OSS (Open Source Software) application, a second source code of a connection destination OSS application, and connection plug-ins for the connection source OSS application and the connection destination OSS application; a first analysis step of calculating a first compatibility based on the number of duplicate data formats between an output plug-in of the first source code and an input plug-in of the second source code; a second analysis step of calculating a second compatibility based on the number of functions and the number of instances included in the connection plug-ins; and a third analysis step of calculating a connection compatibility between the connection source OSS application and the connection destination OSS application using the first compatibility and the second compatibility.

One aspect of the present invention is an analysis program for causing a computer to function as the analysis device.

Advantageous Effects of Invention

According to the present invention, it is possible to provide a technique for analyzing connection compatibility between software applications such as OSS.

DESCRIPTION OF EMBODIMENTS

An embodiment of the present invention will be described below with reference to the drawings. Note that in the following embodiment, OSS applications will be described, but the present invention is not limited to OSS applications, and connection compatibility between software applications other than OSS applications may be analyzed.

Figure 1:
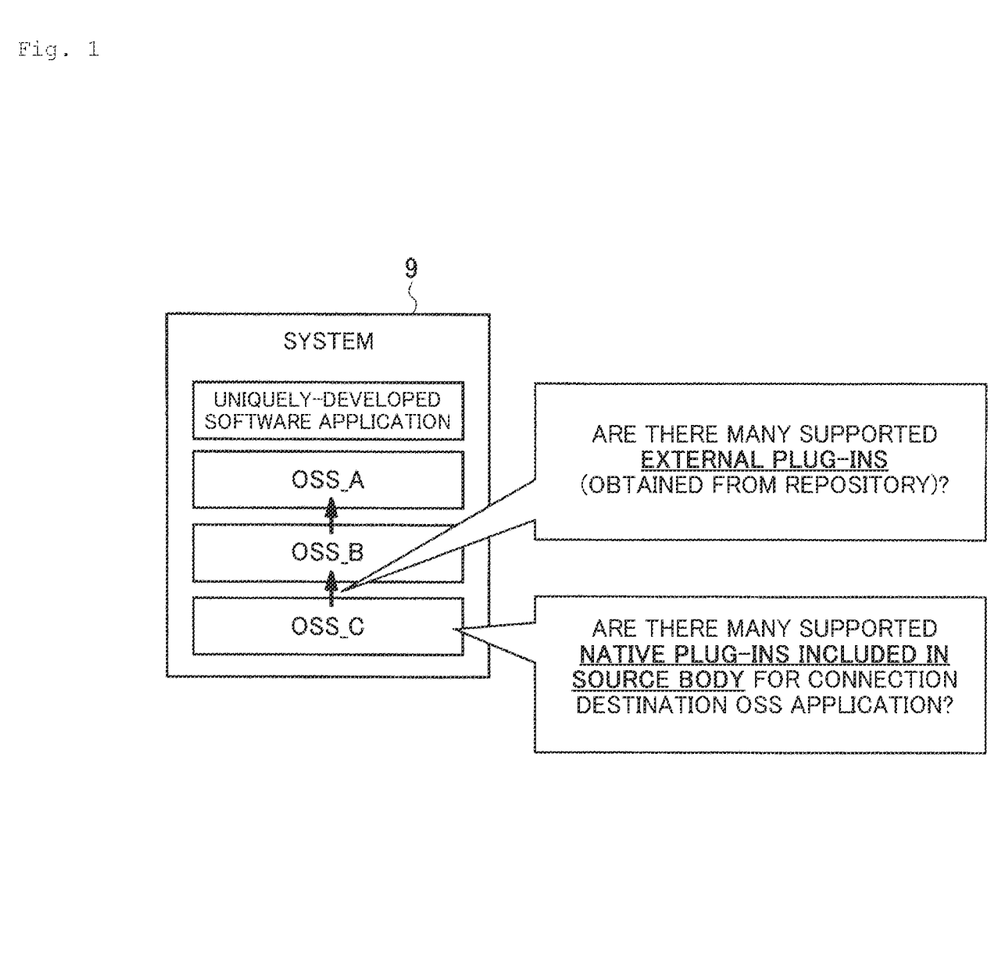
FIG. 1 is an explanatory diagram for explaining an outline of an embodiment of the present invention.

FIG. 1 is an explanatory diagram for explaining an outline of the embodiment of the present invention. In the present embodiment, a certain system 9 is constructed by using a plurality of OSS (Open Source Software) applications. In an illustrated example, it is assumed that the system is constructed by using three OSS applications and a uniquely-developed software application.

In this case, in order to connect an OSS_C application for providing a function C to an OSS-B application for providing a function B, it is necessary to analyze connection compatibility between the OSS-C application and the OSS-B application in advance. In the present embodiment, the connection compatibility between the OSS-C application and the OSS-B application is analyzed without manual investigation or actual deployment of the OSS-C application and the OSS-B application in the system 9. Here, the OSS-C application is a connection source OSS application, and the OSS-B application is a connection destination OSS application.

In the present embodiment, the connection compatibility is analyzed using the degree of support of plug-ins. Specifically, there are two types of OSS application plug-ins: a native plug-in and an external plug-in. The native plug-in is a plug-in included in the source code of the OSS application body. The external plug-in is a connection plug-in obtained from an OSS repository. In the present embodiment, the connection compatibility is analyzed for these two plug-ins. Note that the connection compatibility between the OSS-B application and an OSS-A application can also be analyzed in the same manner in the present embodiment.

Figure 2:
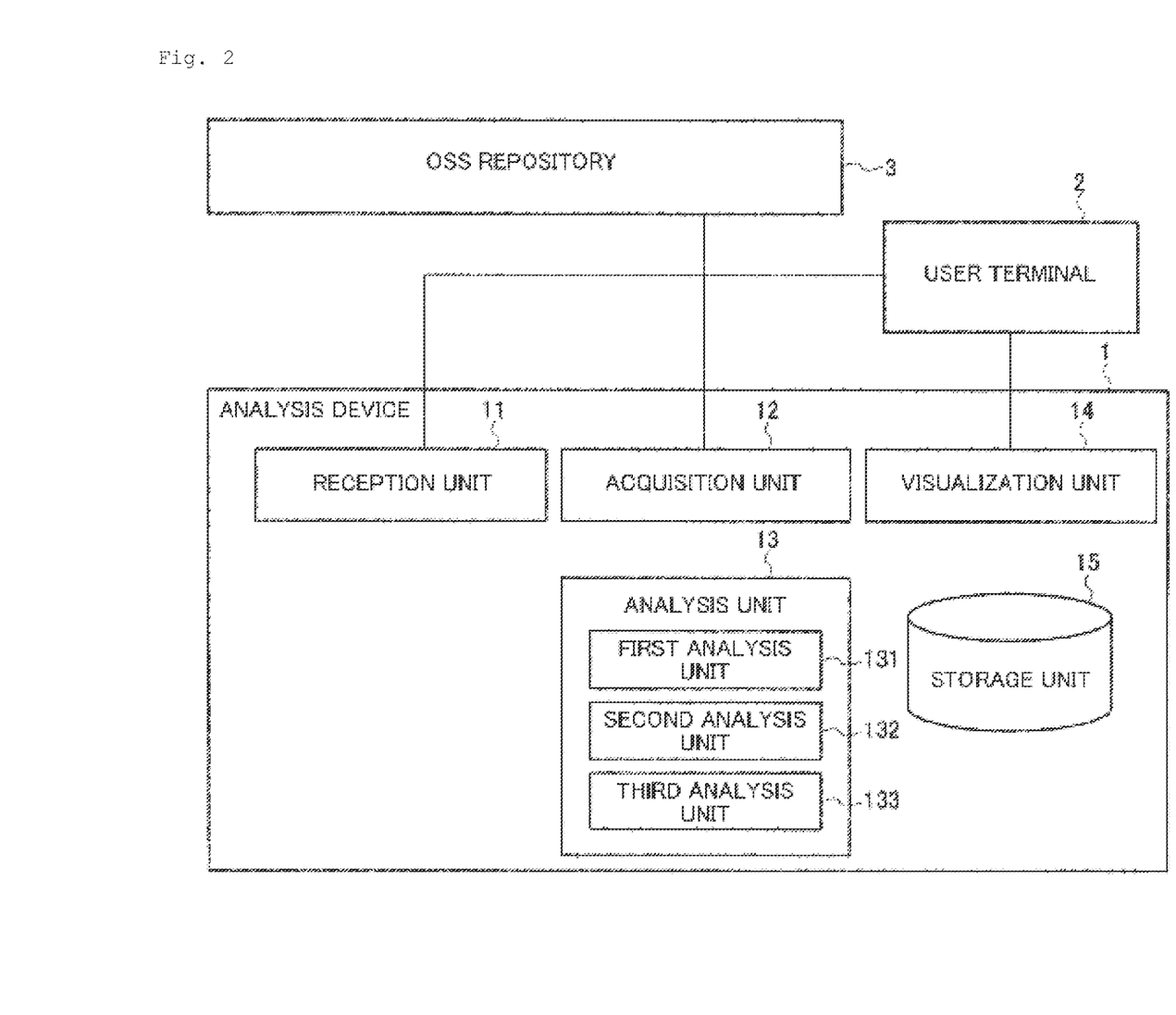
FIG. 2 is a diagram of whole configuration of an analysis system according to the embodiment of the present invention.

FIG. 2 is a system configuration diagram illustrating the whole analysis system according to the embodiment of the present invention. The illustrated analysis system includes an analysis device 1, a user terminal 2, and an OSS repository 3.

The OSS repository 3 is a database that centrally manages various information related to a plurality of OSS applications.

The user terminal 2 is a device that inputs an OSS application to be analyzed into the analysis device 1 and displays an analysis result from the analysis device 1. As the user terminal 2, for example, a computer such as a PC, a tablet, or a smartphone is used.

The analysis device 1 is a device that analyzes the compatibility of connections between OSS applications. As the analysis device 1, for example, a computer such as a server or a PC is used. The analysis device 1 as illustrated includes a reception unit 11, an acquisition unit 12, an analysis unit 13, a visualization unit 14, and a storage unit 15.

The reception unit 11 receives an analysis request in which the two OSS applications to be analyzed are specified from the user terminal 2. For example, the analysis request includes identification information such as the names of the connection source OSS application and the connection destination OSS application. In the present embodiment, it includes the names of the connection source OSS application and the connection destination OSS application. Further, the reception unit 11 may receive at least one of a weight for a first compatibility and a weight of a second compatibility.

The acquisition unit 12 acquires a first source code of the connection source OSS application, a second source code of the connection destination OSS application, and connection plug-ins (external plug-ins) for the connection source OSS application and the connection destination OSS application from the OSS repository 3.

The analysis unit 13 includes a first analysis unit 131, a second analysis unit 132, and a third analysis unit 133. The first analysis unit 131 analyzes and calculates the first compatibility based on the number of duplicate data formats between an output plug-in of the first source code and an input plug-in of the second source code. The second analysis unit 132 analyzes and calculates the second compatibility based on the number of functions and the number of instances included in the connection plug-ins. The third analysis unit 133 calculates the connection compatibility between the connection source OSS application and the connection destination OSS application using the first compatibility and the second compatibility. The third analysis unit 133 may also calculate the connection compatibility using the weights. The first analysis unit 131, the second analysis unit 132, and the third analysis unit 133 store their respective analysis results in the storage unit 15.

The visualization unit 14 generates an image (analysis result image) in which a connection line connecting the connection source OSS application and the connection destination OSS application is drawn with a thickness or type according to the connection compatibility calculated by the analysis unit 13. The visualization unit 14 transmits the generated image to the user terminal 2 to display it on a display (output device) of the user terminal 2. Further, when a connection compatibility of the connection source OSS application with another connection destination OSS application is stored in the storage unit 15, the visualization unit 14 may draw on the generated image a connection line connecting the connection source OSS application and the other connection destination OSS application based on the connection compatibility with the other connection destination OSS application.

Next, processing of the analysis unit 13 will be described.

Figure 3:
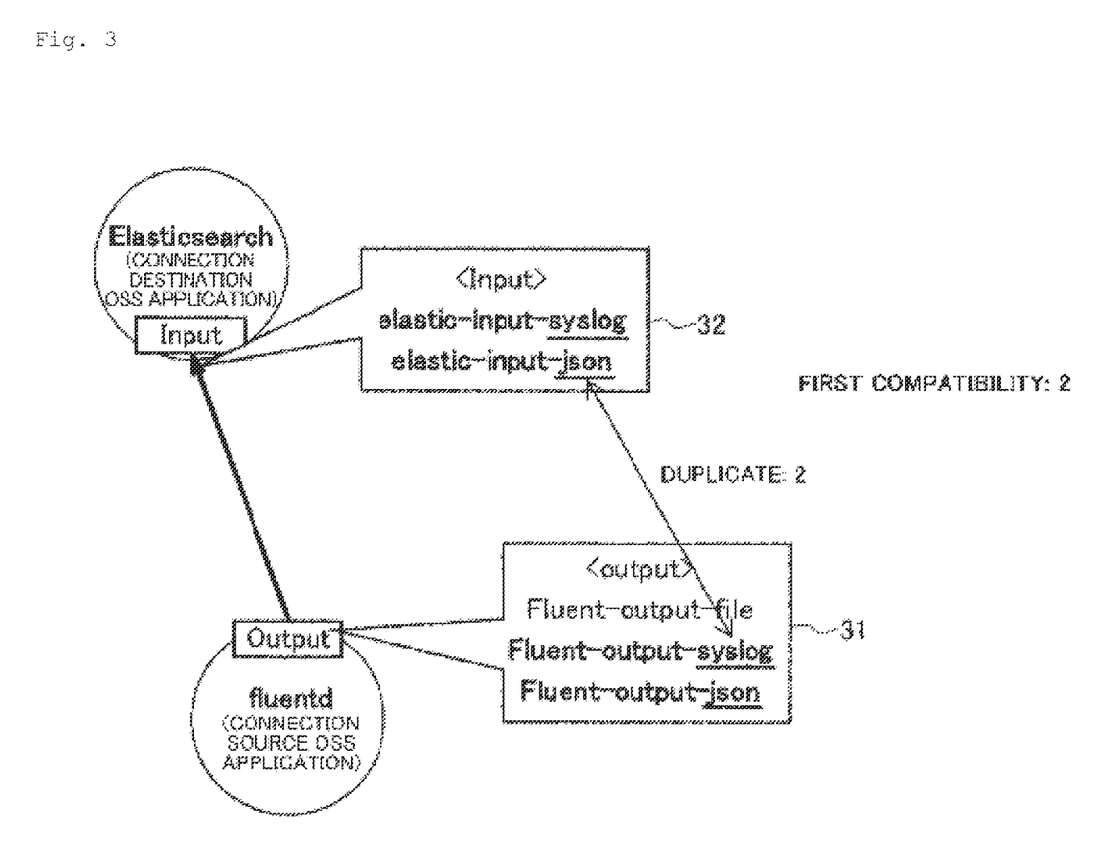
FIG. 3 is a diagram for explaining a first compatibility.

FIG. 3 is an explanatory diagram for explaining processing of the first analysis unit 131. In an illustrated example, "fluentd" is used as the connection source OSS application, and "Elasticsearch" is used as the connection destination OSS application.

The first analysis unit 131 analyzes a source code of the connection source OSS application and a source code of the connection destination OSS application, which are acquired from the OSS repository 3 by the acquisition unit 12. That is, the first analysis unit 131 analyzes the native plug-in.

Specifically, the first analysis unit 131 analyzes the first compatibility between the connection source OSS application and the connection destination OSS application based on the number of duplicate data formats between the output plug-in included in the source code of the connection source OSS application and the input plug-in included in the source code of the connection destination OSS application. When there is any duplicate data format between the output plug-in and the input plug-in, the connection destination OSS application can be regarded as supporting the connection source OSS application. Accordingly, in the present embodiment, the first analysis unit 131 counts duplicate data formats between the output plug-in and the input plug-in, and sets the number of duplicate data formats as the first compatibility.

In the illustrated example, an output plug-in 31 has data formats of "file", "syslog", and "json". An input plug-in 32 has data formats of "syslog" and "json". Therefore, there are two duplicate data formats: "syslog" and "json". In this case, the first analysis unit 131 analyzes the first compatibility as "2". In this way, the first analysis unit 131 analyzes the duplication of distribution data (syslog, json, file, stdin/out, etc.) and calculates the first compatibility.

Figure 4:
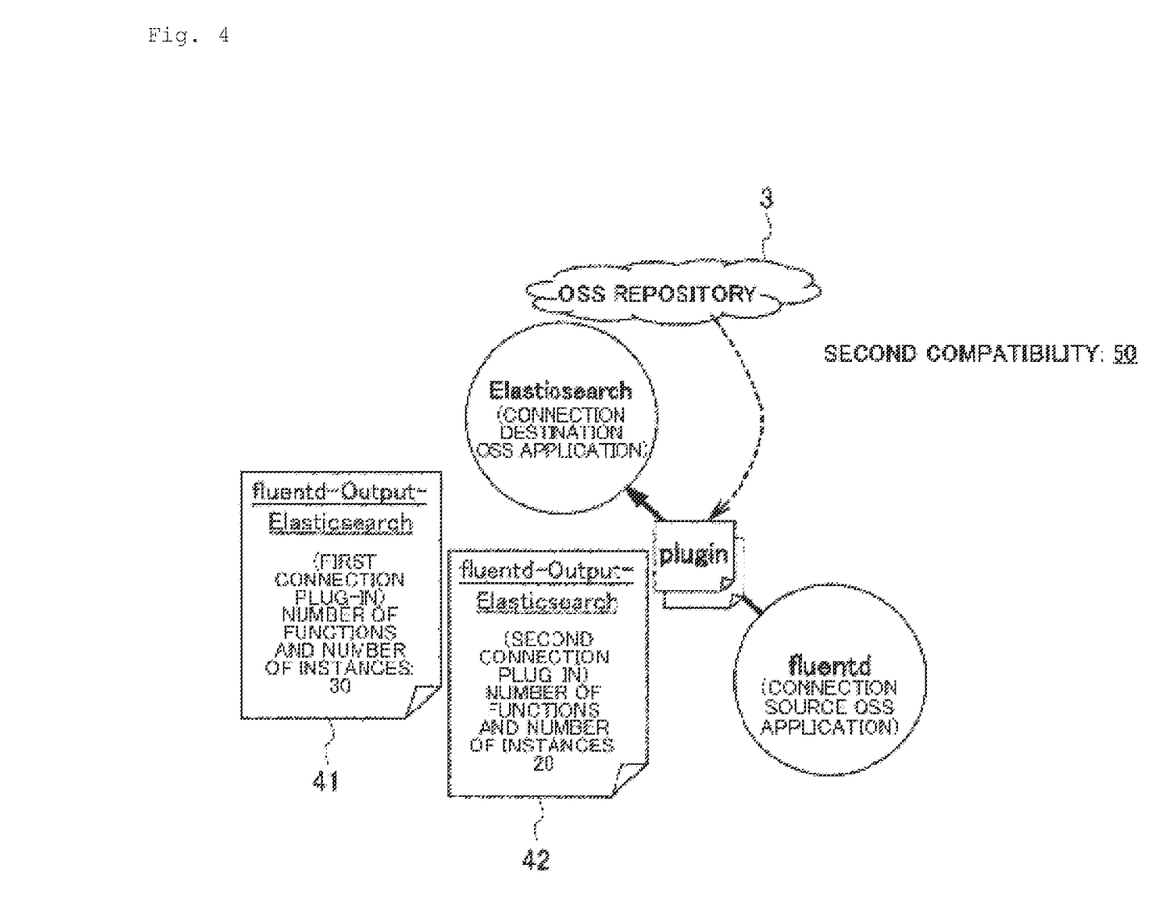
FIG. 4 is a diagram for explaining a second compatibility.

FIG. 4 is an explanatory diagram for explaining processing of the second analysis unit 132. Also in an illustrated example, "fluentd" is used as the connection source OSS application, and "Elasticsearch" is used as the connection destination OSS application.

The second analysis unit 132 analyzes the source code of the connection plug-ins acquired from the OSS repository 3 by the acquisition unit 12. The connection plug-ins are external plug-ins for connecting the connection source OSS application and the connection destination OSS application.

The second analysis unit 132 analyzes the second compatibility between the connection source OSS application and the connection destination OSS application based on the number of functions and the number of instances included in the source code of the connection plug-ins. Each function means a method described in the source code of the connection plug-ins. For example, if the programming language of the source code is Ruby, the second analysis unit 132 counts the number of statements (codes) described as "def xxxx" in the source code, thereby analyzing the number of functions included in the source code.

Further, each instance means a variable used in the function. If the programming language of the source code of the connection plug-ins is Ruby, the second analysis unit 132 counts the number of statements described as "@xxxx" in the source code, thereby analyzing the number of instances included in the source code.

In the illustrated example, the connection plug-ins obtained from the OSS repository 3 are two plug-ins: a first connection plug-in (fluentd-filter-Elasticsearch) 41 and a second connection plug-in (fluentd-output-Elasticsearch) 42. In the first connection plug-in, the number of functions is 20, the number of instances is 10, and the total number of functions and instances is 30. In the second connection plug-in, the number of functions is 15, the number of instances is 5, and the total number of functions and instances is 20. In this case, the second analysis unit 132 sets "50", which is the sum of the number of functions and the number of instances of the first connection plug-in and the second connection plug-in, as the second compatibility.

Note that if there is no connection plug-in in the OSS repository 3, that is, if any connection plug-in cannot be obtained from the OSS repository 3, the second compatibility is 0.

The third analysis unit 133 calculates the connection compatibility between the connection source OSS application and the connection destination OSS application using the first compatibility and the second compatibility.

For example, the third analysis unit 133 may use the sum of the first compatibility and the second compatibility as the connection compatibility. The third analysis unit 133 may also use as the connection compatibility a value obtained by multiplying at least one of the first compatibility and the second compatibility by a weight (weighting coefficient), and adding the first and second compatibilities subjected to the multiplication of weight. If the weight is used, the third analysis unit 133 calculates the connection compatibility by the following equation.

Connection compatibility=First compatibility×Weight for first compatibility+Second compatibility× Weight for second compatibility A predetermined value may be used for each of the weight for the first compatibility and the weight for the second compatibility, or a value specified by a user using the user terminal 2 may be used. The user may also specify at least one of the weight for the first compatibility and the weight for the second compatibility.

If the first compatibility is given priority, the weight for the first compatibility is set to a relatively large value, and the weight for the second compatibility is set to a relatively small value. In this case, examples of connection compatibilities using the compatibilities illustrated in FIGS. 3 and 4 are as follows.

2 (first compatibility)×100 (weight for first compatibility)+50 (second compatibility)×1 (weight for second compatibility)=250

On the other hand, if the second compatibility is given priority, the weight for the second compatibility is set to a relatively large value, and the weight for the first compatibility is set to a relatively small value. In this case, examples of connection compatibilities using the compatibilities illustrated in FIGS. 3 and 4 are as follows.

2 (first compatibility)×10 (weight for first compatibility)+50 (second compatibility)×5 (weight for second compatibility)=270

Next, analysis processing performed by the analysis device 1 of the present embodiment will be described.

Figure 5:
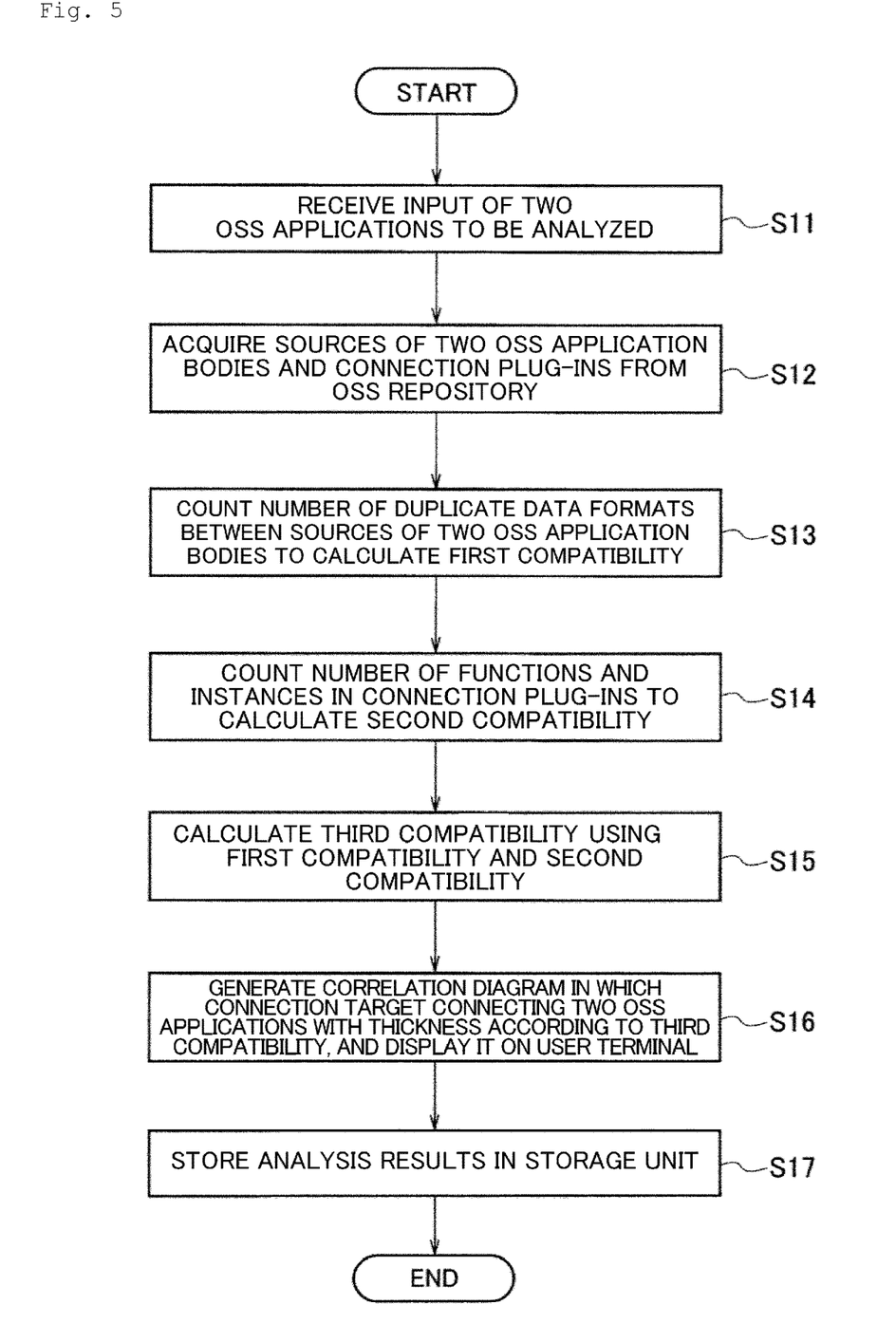
FIG. 5 is a flowchart illustrating analysis processing.

FIG. 5 is a flowchart illustrating the analysis processing of the present embodiment.

The user inputs an analysis request for connection compatibility between two desired OSS applications to the user terminal 2. The user terminal 2 transmits the analysis request input by the user to the analysis device 1. As a result, the reception unit 11 of the analysis device 1 receives the analysis request in which the two OSS applications are specified from the user terminal 2 (step S11).

The analysis request includes the names (identification information) of the connection source OSS application and the connection destination OSS application. Further, when the user inputs at least one of a weight for the first compatibility and a weight for the second compatibility to the user terminal 2, the analysis request includes at least one of the weight for the first compatibility and the weight for the second compatibility.

The acquisition unit 12 accesses the OSS repository 3. Then, the acquisition unit 12 acquires a source code of the connection source OSS application and a source code of the connection destination OSS application from the OSS repository 3 using the connection source OSS application and the connection destination OSS application included in the analysis request as keys. The acquisition unit 12 also acquires connection plug-ins from the OSS repository 3 using the connection source OSS application and the connection destination OSS application as keys (step S12).

The first analysis unit 131 analyzes an output plug-in of the source code of the connection source OSS application and an input plug-in of the source code of the connection destination OSS application, and counts the number of duplicate data formats between the output plug-in and the input plug-in. Then, the first analysis unit 131 calculates a first compatibility based on the number of duplicate data formats (step S13).

The second analysis unit 132 analyzes the source code of the connection plug-ins, and counts the number of functions and the number of instances included in the source code. Then, the second analysis unit 132 calculates a second compatibility based on the number of functions and the number of instances (step S14). When a plurality of connection plug-ins is acquired, the second analysis unit 132 counts the number of functions and the number of instances for each connection plug-in, and calculates the second compatibility based on the total of these numbers.

The third analysis unit 133 calculates a connection compatibility between the connection source OSS application and the connection destination OSS application using the first compatibility and the second compatibility (step S15). Further, when the analysis request in step S11 includes a weight, the third analysis unit 133 calculates the connection compatibility using the weight.

The visualization unit 14 generates an image in which a connection line connecting the connection source OSS application and the connection destination OSS application is drawn with a thickness or type according to the connection compatibility calculated by the third analysis unit 133. Then, the visualization unit 14 transmits the generated image to the user terminal 2 to display it on the display of the user terminal 2 (step 16).

The third analysis unit 133 stores an analysis result such as the calculated connection compatibility in the storage unit 15 (step S17). In addition, the first analysis unit 131 and the second analysis unit 132 also store analysis results in the storage unit.

Figure 6:
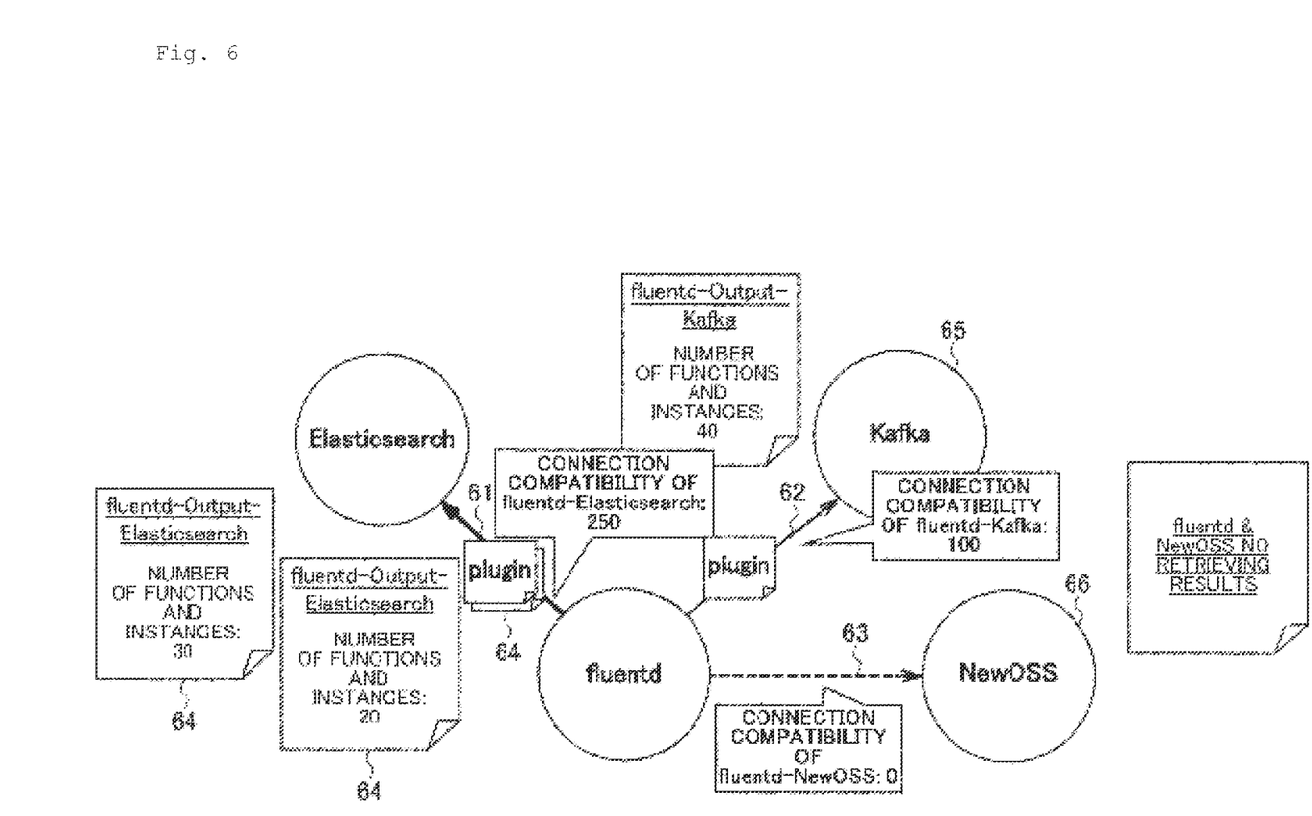
FIG. 6 is an example of an image showing an analysis result.

FIG. 6 is a diagram illustrating an example of an analysis result image generated by the visualization unit 14 and displayed on the user terminal 2. In an illustrated image, a connection line 61 between the connection source OSS application (fluentd) specified in the analysis request and the connection destination OSS application (Elasticsearch) is drawn with a thickness according to the connection compatibility calculated by the third analysis unit 133 (35 in the illustrated example). Further, in the illustrated example, when the connection compatibility is other than 0, it is drawn with a solid line, and when the connection compatibility is 0, it is drawn with a dotted line. When the connection compatibility is 0, it means that the first compatibility and the second compatibility are 0. As illustrated, the visualization unit 14 may also draw retrieved connection plug-ins 64 on the image.

Further, in the illustrated example, when analysis results (connection compatibilities, etc.) for the connection source OSS application with other connection destination OSS applications 65 and 66 are stored in the storage unit 15, the visualization unit 14 may draw on the generated image connection lines 62 and 63 connecting the connection source OSS application and the other connection destination OSS application based on the analysis results with the other connection destination OSS applications 65 and 66. Note that since the connection compatibility with the other connection destination OSS application 66 (NewOSS) is 0, the visualization unit 14 draws the connection line 63 from the connection source OSS application with a dotted line.

The analysis device 1 of the present embodiment described above includes the acquisition unit 12, the first analysis unit 131, the second analysis unit 132, and the third analysis unit 133. The acquisition unit 12 acquires the first source code of the connection source OSS application, the second source code of the connection destination OSS application, and connection plug-ins for the connection source OSS application and the connection destination OSS application. The first analysis unit 131 calculates the first compatibility based on the number of duplicate data formats between the output plug-in of the first source code and the input plug-in of the second source code. The second analysis unit 132 calculates the second compatibility based on the number of functions and the number of instances included in the connection plug-ins. The third analysis unit 133 calculates the connection compatibility between the connection source OSS application and the connection destination OSS application using the first compatibility and the second compatibility.

Thus, in the present embodiment, it is possible to analyze the compatibility of the connection between the OSS applications (the degree of support of plug-ins) without manually investigation or deployment of the OSS applications. Therefore, in the present embodiment, in the development of a large-scale system, when the system is defined as components to implement each component by means of existing software such as OSS, an appropriate OSS application is quickly selected and applied, thereby making it possible to significantly reduce the system development period and development costs. Further, selecting an appropriate OSS application makes it possible to improve the expandability of the system.

Further, the analysis device 1 of the present embodiment includes the visualization unit that generates an image in which a connection line connecting the connection source OSS application and the connection destination OSS application is drawn with a thickness or type according to the connection compatibility. As a result, in the present embodiment, the user can understand the connection compatibility between the OSS applications at a glance (intuitively).

Note that as the analysis device 1 described above, a general-purpose computer system can be used including, for example, a CPU (Central Processing Unit, processor), a memory, a storage (HDD: Hard Disk Drive, SSD: Solid State Drive), a communication device, an input device, an output device, and the like. In this computer system, each function of the analysis device 1 is implemented by the CPU executing a predetermined program loaded on the memory. Further, a program for the analysis device 1 can be stored in a computer-readable recording medium such as an HDD, an SSD, a USB memory, a CD-ROM, a DVD-ROM, or an MO or can be distributed via a network.

Further, the present invention is not limited to the above embodiment, and various modifications can be made within the spirit and scope of the invention. For example, in the above embodiment, a connection compatibility between OSS applications is analyzed, but the present invention is not limited to the OSS applications, and a connection compatibility between software applications other than OSS applications may be analyzed.

REFERENCE SIGNS LIST

1 Analysis device
11 Reception unit
12 Acquisition unit
13 Analysis unit 131 First analysis unit
132 Second analysis unit
133 Third analysis unit
14 Visualization unit
15 Storage unit
2 User terminal
3 OSS repository

The invention claimed is:

1. An analysis device comprising:
a computer readable medium storing instructions; and
one or more processors configured to execute the stored instructions to perform operations comprising:
acquiring (i) a first source code of a connection source OSS (Open Source Software) application, (ii) a respective second source code of each of a plurality of connection destination OSS applications, and (iii) for each of the plurality of connection destination OSS applications, a respective connection plug-in from an OSS repository using the connection source OSS application and the respective connection destination OSS application as keys;
calculating, for each of the plurality of connection destination OSS applications, a respective first compatibility based on a number of duplicate data formats between an output plug-in of the first source code and an input plug-in of the respective second source code;
calculating, for each of the plurality of connection destination OSS applications, a respective second compatibility based on a number of functions and a number of instances included in the respective connection plug-in;
calculating, for each of the plurality of connection destination OSS applications, a respective connection compatibility between the connection source OSS application and the respective connection destination OSS application using the respective first compatibility and the respective second compatibility;
generating an image to display, for each of the plurality of connection destination OSS applications, a respective connection line connecting the connection source OSS application and the respective connection destination OSS application with a respective thickness or type according to the respective connection compatibility;
selecting, based on the connection compatibilities, an optimum OSS application from the plurality of connection destination OSS applications; and
combining the optimum OSS application and the connection source OSS into a system comprising a plurality of application components.

2. The analysis device according to claim 1, wherein the operations further comprise:
receiving at least one of a first weight for the first compatibility and a second weight for the second compatibility, and calculating the connection compatibility using at least one of the first weight and the second weight.

3. An analysis method implemented by a computer, the analysis method comprising:
acquiring (i) a first source code of a connection source OSS (Open Source Software) application, (ii) a respective second source code of each of a plurality of connection destination OSS applications, and (iii) for each of the plurality of connection destination OSS applications, a respective connection plug-in from an OSS repository using the connection source OSS application and the respective connection destination OSS application as keys;
calculating, for each of the plurality of connection destination OSS applications, a respective first compatibility based on a number of duplicate data formats between an output plug-in of the first source code and an input plug-in of the respective second source code;
calculating, for each of the plurality of connection destination OSS applications, a respective second compatibility based on a number of functions and a number of instances included in the respective connection plug-in;
calculating, for each of the plurality of connection destination OSS applications, a respective connection compatibility between the connection source OSS application and the respective connection destination OSS application using the respective first compatibility and the respective second compatibility;
generating an image to display, for each of the plurality of connection destination OSS applications, a respective connection line connecting the connection source OSS application and the respective connection destination OSS application with a respective thickness or type according to the respective connection compatibility;
selecting, based on the connection compatibilities, an optimum OSS application from the plurality of connection destination OSS applications; and
combining the optimum OSS application and the connection source OSS into a system comprising a plurality of application components.

4. The analysis method according to claim 3, further comprising, receiving at least one of a first weight for the first compatibility and a second weight for the second compatibility, and calculating the connection compatibility using at least one of the first weight and the second weight.

5. An non-transitory computer readable medium storing one or more instructions causing a processor to execute:
acquiring (i) a first source code of a connection source OSS (Open Source Software) application, (ii) a respective second source code of each of a plurality of connection destination OSS applications, and (iii) for each of the plurality of connection destination OSS applications, a respective connection plug-in from an OSS repository using the connection source OSS application and the respective connection destination OSS application as keys;
calculating, for each of the plurality of connection destination OSS applications, a respective first compatibility based on a number of duplicate data formats between an output plug-in of the first source code and an input plug-in of the respective second source code;
calculating, for each of the plurality of connection destination OSS applications, a respective second compatibility based on a number of functions and a number of instances included in the respective connection plug-in;
calculating, for each of the plurality of connection destination OSS applications, a respective connection compatibility between the connection source OSS application and the respective connection destination OSS application using the respective first compatibility and the respective second compatibility;
generating an image to display, for each of the plurality of connection destination OSS applications, a respective connection line connecting the connection source OSS application and the respective connection destination OSS application with a respective thickness or type according to the respective connection compatibility;
selecting, based on the connection compatibilities, an optimum OSS application from the plurality of connection destination OSS applications;

combining the optimum OSS application and the connection source OSS into a system comprising a plurality of application components.

* * * * *